Nov. 12, 1946. W. T. SAXON 2,411,061
TRACTOR
Filed Oct. 5, 1944
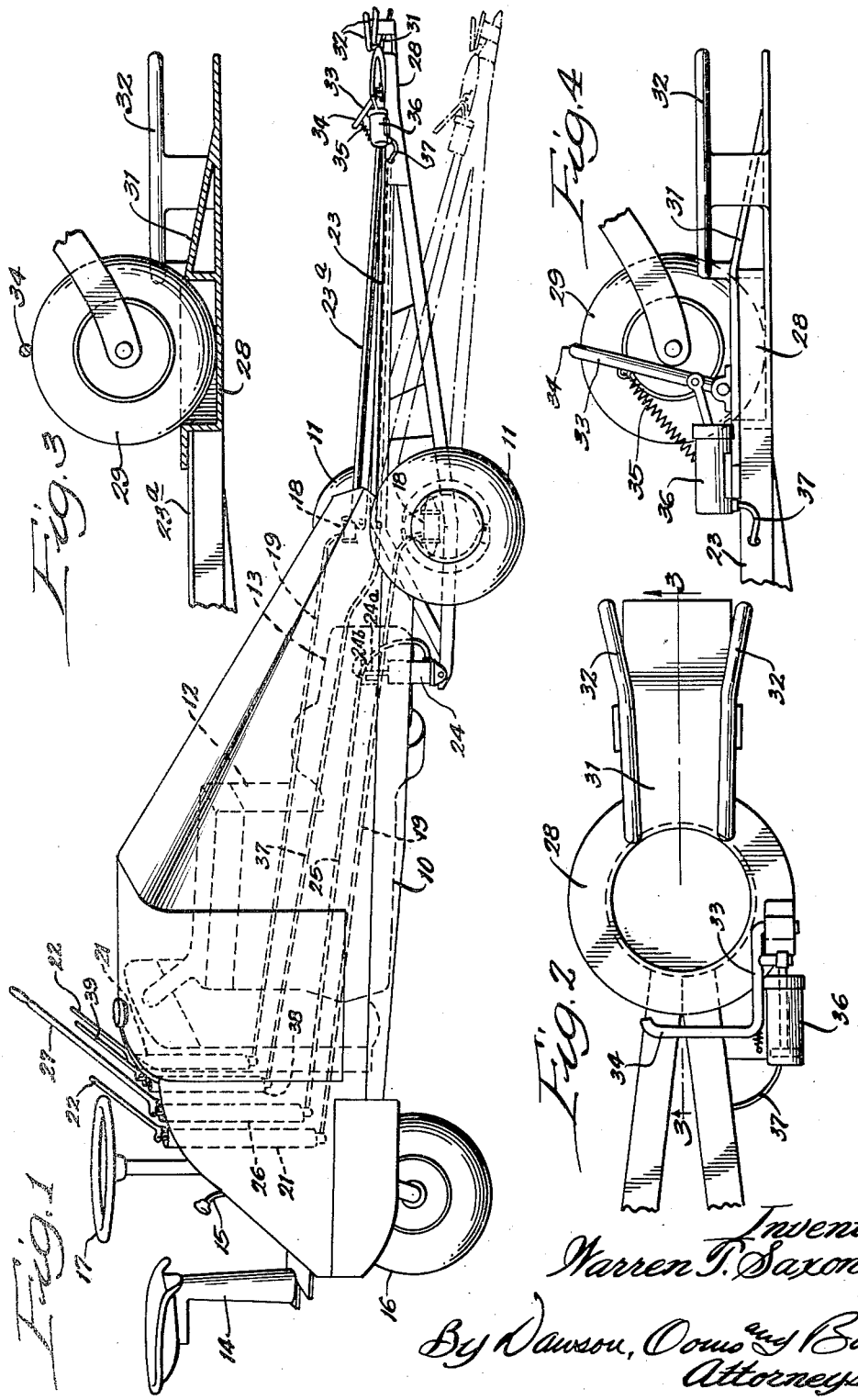
Inventor:
Warren T. Saxon,
By Dawson, Ooms and Borth
Attorneys.

Patented Nov. 12, 1946

2,411,061

UNITED STATES PATENT OFFICE 2,411,061

TRACTOR

Warren T. Saxon, Cedar Rapids, Iowa

Application October 5, 1944, Serial No. 557,252

8 Claims. (Cl. 214—65)

This invention relates to a tractor and more particularly to a tractor for handling aircraft or the like on the ground.

In handling aircraft in airports and under like circumstances on the ground, it has been the usual practice to move the aircraft about manually to different positions on the airfield or into storage position in a hangar. This practice requires the assistance of several people and when the necessary number of people are not available, it becomes exceedingly difficult, if not impossible, to move the aircraft and to store them in hangars.

It is one of the objects of the present invention to provide a tractor with which one man can easily move aircraft to different positions on a field or to a storage position in a hangar.

Another object of the invention is to provide a tractor having provisions for holding a wheel such as the tailwheel of an aircraft so that the aircraft can easily be moved.

Still another object is to provide a tractor provided with supporting means for an aircraft wheel by which the aircraft tail wheel can be raised from the ground and securely held in position from a remote control point on the tractor.

Still another object is to provide a tractor which can be turned and maneuvered in a small space.

The above and other objects and advantages of the invention will be more readily apparent from the following description when read in connection with the accompanying drawing, in which—

Figure 1 is a perspective view of a tractor embodying the invention;

Figure 2 is an enlarged plan view of the wheel engaging and supporting means;

Figure 3 is a section on the line 3—3 of Figure 2; and

Figure 4 is a side elevation looking from the bottom of Figure 2.

The tractor as shown on the drawing, comprises a main frame portion 10 supported at one end on a pair of wheels 11 which are connected thru a conventional type of differential. The frame 10 carries an engine 12 connected thru a transmission 13 to the differential to drive the wheels 11 in either direction for forward or rearward movement of the tractor. The transmission may be controlled from an operator seat 14 at the rear end thereof thru a transmission shift lever 15.

The opposite end of the tractor is supported on a single central wheel 16 which is swivelly connected to the tractor frame and which may be steered thru a wheel 17 adjacent the operator's seat. With this arrangement the tractor can be turned in a very short radius in either direction of motion, the swivel connection of the wheel 16 preferably being a full swivel.

In order to provide better control of the tractor during turning the wheels 11 are preferably provided with independently controllable brakes. As shown, the brakes are of the hydraulic type controlled thru separate wheel cylinders 18 on the wheels. The cylinders 18 are connected thru conduits 19 to separate master cylinders 21 having separate operating levers 22. In this way one wheel can be held so that the tractor can, if desired, be turned in its own length.

An aircraft is adapted to be engaged and moved by the tractor thru an arm 23 which may be of strut construction as shown and which is pivoted intermediate its ends to the tractor frame adjacent the wheels 11. The arm 23 is braced laterally by an arm 23a which is connected to the outer end of the arm 23 and is pivoted to the tractor frame at a point spaced from the arm 23. A fluid motor or hydraulic jack 24 is pivoted to the rear end of the arm 23 and has a piston rod 24a engaging a bracket 24b on the tractor frame so that when the jack is extended the arm 23 will be raised from its lower dotted line position shown in Figure 1 to its upper full line position. The motor 24 is supplied with actuating fluid thru a pipe 25 from a pump 26 adjacent the operator's seat. The pump 26 may be similar to the usual hydraulic brake master cylinder and is shown as controlled by a lever 27 adjacent the operator's seat. When the pump 26 is operated the arm 23 will be swung about its pivot to raise its outer end.

The outer end of the arm is formed to engage and support an aircraft wheel such, for example, as the tailwheel. As best seen in Figures 2, 3 and 4 a circular open top cup member 28 is rigidly carried by the outer end of the arm and may be of such a size as to receive an aircraft tailwheel indicated at 29 in Figures 3 and 4. The wheel is directed into the cup by a ramp member 31 projecting beyond the outer end of the cup and sloping downwardly so that its forward end will lie on the ground when the arm is lowered. Preferably, guide bars 32 project above the ramp member on the opposite sides thereof to guide the wheel over the ramp member into the cup.

A wheel supported in the cup is clamped in place therein by clamping means shown as a pivoted arm or lever 33 pivoted at one end on the side of the cup. The free end of the arm is bent over as shown at 34 to overlie the aircraft wheel and hold it in place in the cup. It will be apparent that for wheels of different sizes different length arms may be provided so that the end portion 34 will engage the wheel adjacent its top and hold it firmly in place in the cup during movement of the aircraft.

The clamping lever 33 is urged toward its inoperative position by a spring 35 and is adapted to be moved into engagement with the wheel by a hydraulic motor 36 carried by the cup member. The motor 36 is supplied with actuating fluid thru a flexible conduit 37 connected to a master cylinder or pump 38 which is controlled thru a lever 39 adjacent the operator's seat.

In using the tractor the operator may drive it to a position in line with the tail wheel of an aircraft to be moved with the arm 23 lowered. When the ramp 31 is in a position touching the bottom part of the wheel further forward movement of the tractor will cause the wheel to ride up over the ramp into the cup member 28. The operator may then actuate the lever 39 to move the clamp arm 33 into its clamping position so that the wheel will be firmly held in the cup member. By then operating the lever 27 the arm 23 will be raised to elevate the wheel above the ground.

With the parts in this position the operator may readily move the aircraft to any desired position on the field or in a hangar, the aircraft tailwheel swiveling during this operation to permit easy turning of the tractor. Due to the length of the arm 23 and the fact that the tractor may be made of relatively low height it can easily be maneuvered under the elevators and like projecting parts of the aircraft so that the aircraft can be moved forward, sideways, or backward to place it in any desired position. During this movement the clamping member will hold the wheel firmly in place in the cup so that it will not be released even in passing over relatively rough ground.

When the plane has been moved to the desired position the arm 23 may be lowered and the clamp arm 33 may be released. Upon backing the tractor away from the aircraft the tailwheel will ride over the ramp 31 to the ground leaving the aircraft in the desired position and freeing the tractor for use to move other aircraft.

While one embodiment of the invention has been shown and described in detail herein, it will be understood that this is illustrative only and is not intended as a definition of the scope of the invention, reference being had for this purpose to the appended claims.

What is claimed is:

1. A tractor for handling aircraft or the like comprising a tractor unit supported on wheels, an arm pivoted on the tractor unit and projecting beyond one end thereof, means on the tractor unit to move the arm about its pivot to raise the outer end thereof, a cupped member carried by the arm at its outer end to receive an aircraft wheel, and clamping means on the member to engage a wheel at a point substantially diametrically opposite the cupped member and hold it in place in the member.

2. A tractor for handling aircraft or the like comprising a tractor unit supported on wheels, an arm pivoted on the tractor unit and projecting beyond one end thereof, means on the tractor unit to move the arm about its pivot to raise the outer end thereof, a cupped member carried by the arm at its outer end to receive an aircraft wheel, an arm pivotally mounted on the cupped member to engage a wheel and hold it in the cupped member, and means operable from the tractor to move the arm about its pivot.

3. A tractor for handling aircraft or the like comprising a tractor unit supported on wheels, an arm pivoted on the tractor unit and projecting beyond one end thereof, means on the tractor unit to move the arm about its pivot to raise the outer end thereof, means on the arm adjacent its outer end to support an aircraft wheel, clamping means associated with said means to engage a wheel to hold it in place, a hydraulic motor on said means connected to the clamping means to operate it, and a hydraulic pump unit on the tractor connected to the motor to supply operating fluid thereto.

4. A tractor for handling aircraft or the like comprising a tractor unit supported on wheels, an arm pivoted on the tractor unit and projecting beyond one end thereof, means on the tractor unit to move the arm about its pivot to raise the outer end thereof, an open topped cup member carried by the outer end of the arm to receive an aircraft wheel, a ramp member projecting outward from the cup member, guide members extending above the ramp member on the opposite sides thereof to guide a wheel over the ramp member into the cup member, a clamping arm pivoted adjacent the cup member having an angular end portion to engage the top part of a wheel to hold it in the cup member, and means controllable from the tractor to move the arm about its pivot.

5. A tractor for handling aircraft or the like comprising a tractor unit supported on wheels, an arm pivoted on the tractor unit and projecting beyond one end thereof, means on the tractor unit to move the arm about its pivot to raise the outer end thereof, an open topped cup member carried by the outer end of the arm to receive an aircraft wheel, a ramp member projecting outward from the cup member, guide members extending above the ramp member on the opposite sides thereof to guide a wheel over the ramp member into the cup member, a clamping arm pivoted adjacent the cup member having an angular end portion to engage the top part of a wheel to hold it in the cup member, a hydraulic motor mounted adjacent the cup member and connected to the clamping member, and a hydraulic pump on the tractor connected to the motor to supply operating liquid thereto.

6. A tractor for handling aircraft or the like comprising a frame, a power unit on the frame, a pair of wheels at one end of the frame drivably connected to the power unit, a single wheel swively mounted adjacent the other end of the frame, an operator's seat on the frame, means controllable from a point adjacent the operator's seat for steering the last named wheel, an arm pivoted on said one end of the frame and projecting outward therefrom, means on the frame to move the arm about its pivot means controllable from a point adjacent the operator's seat to control the last named means, and means at the outer end of the arm to hold an aircraft wheel.

7. A tractor for handling aircraft or the like comprising a frame, a power unit on the frame, a pair of wheels at one end of the frame drivably connected to the power unit, a single wheel swively mounted adjacent the other end of the frame, means for steering the last named wheel, independently operable brakes for the first named wheels, an operator's seat adjacent the steering means, control means for the brakes adjacent the operator's seat, an arm pivoted on the frame adjacent the first named wheels and projecting outward therefrom, means on the frame controllable from a position adjacent the operator's seat to move the arm about its pivot to raise its outer end, and means at the outer end of the arm to hold an aircraft wheel.

8. A tractor for handling aircraft or the like comprising a frame, a power unit on the frame, a pair of wheels at one end of the frame drivably connected to the power unit, a single wheel swivelly mounted adjacent the other end of the frame, means for steering the last named wheel, independently operable brakes for the first named wheels, an operator's seat adjacent the steering means, control means for the brakes adjacent the operator's seat, an arm pivoted on the frame adjacent the first named wheels and projecting outward therefrom, means on the frame controllable from a position adjacent the operator's seat to move the arm about its pivot to raise its outer end, means at the outer end of the arm to receive an aircraft wheel clamping means associated with the last named means to hold a wheel in place therein, and means controllable from adjacent the operator's seat to operate the clamping means.

WARREN T. SAXON.